(No Model.)

B. BUTLER.
IMPLEMENT FOR DROPPING FERTILIZERS.

No. 396,351. Patented Jan. 15, 1889.

Witnesses:
E. M. Wooster,
M. H. Wooster.

Inventor:
Beauman Butler.
By D. B. Wooster
Att'y.

UNITED STATES PATENT OFFICE.

BEAUMAN BUTLER, OF ST. JOHNSBURY CENTRE, VERMONT.

IMPLEMENT FOR DROPPING FERTILIZER.

SPECIFICATION forming part of Letters Patent No. 396,351, dated January 15, 1889.

Application filed May 16, 1888. Serial No. 274,112. (No model.)

*To all whom it may concern:*

Be it known that I, BEAUMAN BUTLER, a citizen of the United States, residing at St. Johnsbury Centre, in the county of Caledonia and State of Vermont, have invented a new and useful Implement for Dropping Phosphate or other Pulverized Fertilizer in the Hill, of which the following is a specification.

The object of this invention is to provide a vessel to hold the fertilizer so constructed that by moving a handle, the lower end of which is provided with corrugated wings, the fertilizer is applied in a circle around the hill. The vessel designed to carry out this plan is illustrated in the accompanying drawings, forming part of this specification.

Figure 1:
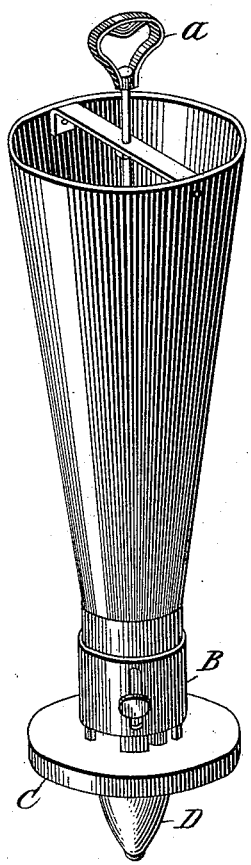
Figure 2:
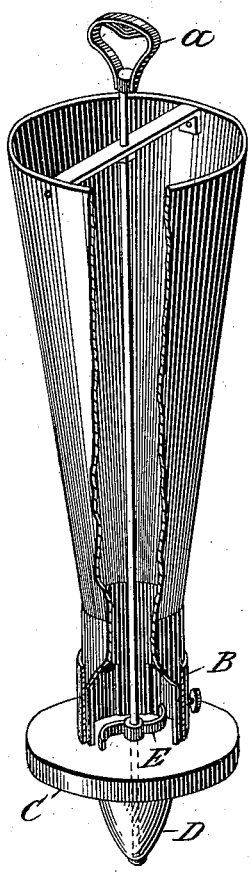
Figure 3:
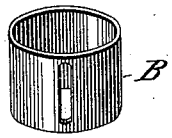

Figure 1 is a view in perspective of my apparatus. Fig. 2 is a perspective view with a part cut away, showing the inner mechanism. Fig. 3 is a view of the band.

A is the handle by which the apparatus is moved from hill to hill.

B is a sliding band.

C is a table.

D is the lower portion of the conoidal vessel.

E shows the curved or corrugated wings located at the lower portion of the handle A.

It will be seen that by moving up or down the sliding band B the size of the openings shown in the vessel above table C can be increased or diminished, as desired, and by turning the handle A the fertilizer is pressed outward and over the periphery of table D, strewing it in a circle around the hill.

I have shown my invention in Figs. 1 and 2; but I would have it understood that I am not limited to any special configuration.

What I claim as new, and desire to secure by Letters Patent, is—

1. The combination, with a vessel adapted to hold and drop fertilizing material, of side openings near its lower end and a handle having corrugated wings attached at its lower end, adjusted to press the fertilizer through the side openings, as and for the purpose set forth.

2. The combination, with a vessel adapted to hold and drop fertilizing material, substantially as described, of a sliding band near the lower end of the vessel, for the purpose of opening or closing said side openings, as and for the purpose set forth.

In testimony whereof I have affixed my signature in presence of two subscribing witnesses.

BEAUMAN BUTLER.

Witnesses:
DAVID TRULL,
HARRY L. HEALD.